(12) United States Patent
Gambino et al.

(10) Patent No.: US 9,715,064 B1
(45) Date of Patent: Jul. 25, 2017

(54) MULTI-CHIP MODULES WITH VERTICALLY ALIGNED GRATING COUPLERS FOR TRANSMISSION OF LIGHT SIGNALS BETWEEN OPTICAL WAVEGUIDES

(71) Applicant: GLOBALFOUNDRIES INC., Grand Cayman (KY)

(72) Inventors: Jeffrey P. Gambino, Gresham, OR (US); Robert K. Leidy, Burlington, VT (US); John J. Ellis-Monaghan, Grand Isle, VT (US); Brett T. Cucci, Essex Junction, VT (US); Jeffrey C. Maling, Grand Isle, VT (US); Jessie C. Rosenberg, Mount Vernon, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 15/263,817

(22) Filed: Sep. 13, 2016

(51) Int. Cl.
*G02B 6/124* (2006.01)
*G02B 6/34* (2006.01)
*G02B 6/12* (2006.01)

(52) U.S. Cl.
CPC ............. *G02B 6/124* (2013.01); *G02B 6/34* (2013.01); *G02B 2006/12107* (2013.01)

(58) Field of Classification Search
CPC . G02B 6/124; G02B 6/34; G02B 2006/12107
See application file for complete search history.

(56) References Cited

U.S. PATENT DOCUMENTS 6,392,296 B1   5/2002  Ahn et al.
7,480,429 B1 * 1/2009  Chiniwalla ......... G02B 6/1228
                                                385/129

(Continued)

FOREIGN PATENT DOCUMENTS

EP        2639978        9/2013

OTHER PUBLICATIONS

William M. J. Green et al., "Silicon photonic wire circuits for on-chip optical interconnects", Proc. of SPIE vol. 6883, 2008, pp. 1-10.
Ashkok V. Krishnamoorthy et al., "Computer Systems Based on Silicon Photonic Interconnects", Proceedings of the IEEE, vol. 97, No. 7, 2009, pp. 1337-1361.
Ashkok V. Krishnamoorthy et al., "Optical Proximity Communication With Passively Aligned Silicon Photonic Chips", IEEE Journal of Quantum Electronics, vol. 45, No. 4, Apr. 2009, pp. 409-414.

(Continued)

*Primary Examiner* — Ryan Lepisto
(74) *Attorney, Agent, or Firm* — Gibb & Riley, LLC; Michael J. LeStrange, Esq.

(57) ABSTRACT

Disclosed are multi-chip modules (MCMs) that allow for chip-to-chip transmission of light signals. The MCMs can incorporate at least two components, which are attached (e.g., by interconnects). For example, in one MCM disclosed herein, the two components can be an integrated circuit chip and an interposer to which the integrated circuit chip and one or more additional integrated circuit chips are attached by interconnects. In another MCM disclosed herein, the two components can be two integrated circuit chips that are stacked and attached to each other by interconnects. In either case, the two components can each have a waveguide and a grating coupler coupled to one end of the waveguide. The grating couplers on the different components can be approximately vertically aligned, thereby allowing light signals to be transmitted between the waveguides on those different components. Also, disclosed herein are methods of forming such MCMs.

20 Claims, 10 Drawing Sheets

(56) References Cited

U.S. PATENT DOCUMENTS

| | | | |
|---|---|---|---|
| 8,267,583 B2* | 9/2012 | Yao | G02B 6/12002 384/31 |
| 8,503,841 B2* | 8/2013 | Kopp | G02B 6/126 385/11 |
| 8,768,123 B2* | 7/2014 | Yao | G02B 6/12002 385/18 |
| 8,831,437 B2 | 9/2014 | Dobbelaere et al. | |
| 2013/0230274 A1* | 9/2013 | Fish | G02B 6/305 385/14 |
| 2015/0211960 A1* | 7/2015 | Shimizu | G02B 6/02057 356/73.1 |
| 2015/0286008 A1* | 10/2015 | Shimizu | G02B 6/34 385/37 |

OTHER PUBLICATIONS

N. Lindenmann et al., "Photonic wire bonding: a novel concept for chipscale interconnects", Optics Express, vol. 20, No. 16, Jul. 30, 2012, pp. 17667-17677.

G. Pares, "3D Interposer for Silicon Photonics", Green IT workshop, Leti Days 2013, pp. 1-43.

Patrik Rath et al., "Grating-assisted coupling to nanophotonic circuits in microcrystalline diamond thin films", Beilstein J. Nanotechnol, May 7, 2013, pp. 300-305.

Wim Bogaerts, "Lecture: Coupling light tosilicon photonic circuits", Version: Nov. 2009, pp. 1-114.

Maurizio Zuffada, "Low Cost Silicon Photonics Technology Platform: Plans, Perspectives and Roadmap", ECOC 2013—Workshop on PICs London—Sep. 22, 2013, pp. 1-15.

\* cited by examiner

MULTI-CHIP MODULES WITH VERTICALLY ALIGNED GRATING COUPLERS FOR TRANSMISSION OF LIGHT SIGNALS BETWEEN OPTICAL WAVEGUIDES

FIELD OF THE INVENTION

The present disclosure relates to optoelectronics and, more specifically, multi-chip modules that incorporate optical devices.

BACKGROUND

Optoelectronic integrated circuit chips typically incorporate a variety of optical devices. For example, a grating coupler can receive a light signal from an off-chip optical fiber or a light source (e.g., a light-emitting diode (LED) or laser diode) can generate a light signal from an electronic signal. In either case, the light signal can be transmitted to an optical waveguide, which, in turn, transmits the light signal to a photodetector (also referred to herein as a photosensor or optical receiver). The photodetector can convert the light signal into an electronic signal for further processing. Such on-chip optical devices (e.g., grating couplers, light sources, optical waveguides and photodetectors) and off-chip optical devices (e.g., optical fibers) allow for the transmission of light signals (as opposed to electronic signals) and, thereby enable high bandwidth communication at an attractive price point. Unfortunately, the currently available electronic connections between integrated circuit chips in multi-chip modules (MCMs) cannot support this same high bandwidth communication.

SUMMARY

In view of the foregoing, disclosed herein are multi-chip modules (MCMs) that allow for chip-to-chip transmission of light signals. Specifically, the disclosed MCMs can incorporate at least two components, which are attached (e.g., by interconnects). For example, in one MCM disclosed herein, the two components can be an integrated circuit chip and an interposer to which the integrated circuit chip and one or more additional integrated circuit chips are attached by interconnects. In another MCM disclosed herein, the two components can be two integrated circuit chips that are stacked and attached to each other by interconnects. In either case, the two components can each have an optical waveguide and a grating coupler coupled to one end of the optical waveguide. The grating couplers on the different components can be approximately vertically aligned, thereby allowing light signals to be transmitted between the optical waveguides on those different components. Also, disclosed herein are methods of forming such MCMs.

Generally, disclosed herein are various embodiments of multi-chip modules (MCM). Each MCM can incorporate a first component having a first optical waveguide and a first grating coupler coupled to the first optical waveguide at one end. Each MCM can also incorporate a second component having a second optical waveguide and a second grating coupler coupled to the second optical waveguide at one end. The first component can be positioned relative to the second component and attached thereto by interconnects such that the first grating coupler is approximately vertically aligned with the second grating coupler. In this configuration, the vertical alignment of the first grating coupler of the first component and the second grating coupler of the second component allows transmission of light signals between the first optical waveguide and the second optical waveguide.

More specifically, disclosed herein are several alternative embodiments of an MCM, wherein multiple integrated circuit chips are electrically connected to each other and to a package substrate through an interposer. In this case, the first component can be one of the integrated circuit chips. This integrated circuit chip can have a first optical waveguide and a first grating coupler coupled to the first optical waveguide at one end. The second component can be the interposer and this interposer can have a second optical waveguide and a second grating coupler coupled to the second optical waveguide at one end. The integrated circuit chip can be positioned relative to the interposer and attached thereto by interconnects such that the first grating coupler is approximately vertically aligned with the second grating coupler. In this configuration, the vertical alignment of the first grating coupler of the integrated circuit chip and the second grating coupler of the interposer allows transmission of light signals between the first optical waveguide and the second optical waveguide.

Also disclosed herein are various embodiments of an MCM, wherein multiple integrated circuit chips are stacked and electrically connected to each other. In this case, the first component can be a first integrated circuit chip, which has a first optical waveguide and a first grating coupler coupled to the first optical waveguide at one end. The second component can be a second integrated circuit chip, which has a second optical waveguide and a second grating coupler coupled to the second optical waveguide at one end. The first integrated circuit chip can be positioned relative to the second integrated circuit chip and attached thereto by interconnects such that the first grating coupler is approximately vertically aligned with the second grating coupler. In this configuration, the vertical alignment of the first grating coupler of the first integrated circuit chip and the second grating coupler of the second integrated circuit chip allows transmission of light signals between the first optical waveguide and the second optical waveguide.

Also disclosed herein are methods of forming the above-described MCMs. In the methods, a first component can be formed such that it has a first optical waveguide and a first grating coupler coupled to the first optical waveguide at one end. Additionally, a second component can be formed such that it has a second optical waveguide and a second grating coupler coupled to the second optical waveguide at one end. It should be noted that if the MCM being formed has multiple integrated circuit chips that are to be electrically connected to each other and to a package substrate through an interposer, then the first component can be an integrated circuit chip and the second component can be an interposer. However, if the MCM being formed has multiple integrated circuit chips stacked vertically and electrically connected to each other, then the first component formed can be a first integrated circuit chip and the second component formed can be a second integrated circuit chip. In either case, the first component can be positioned relative to the second component and attached thereto by interconnects such that the first grating coupler is approximately vertically aligned with the second grating coupler. Forming an MCM in this manner with the first grating coupler of the first component and the second grating coupler of the second component being approximately vertically aligned allows for transmission of light signals between the first optical waveguide and the second optical waveguide.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

Figure 1A:
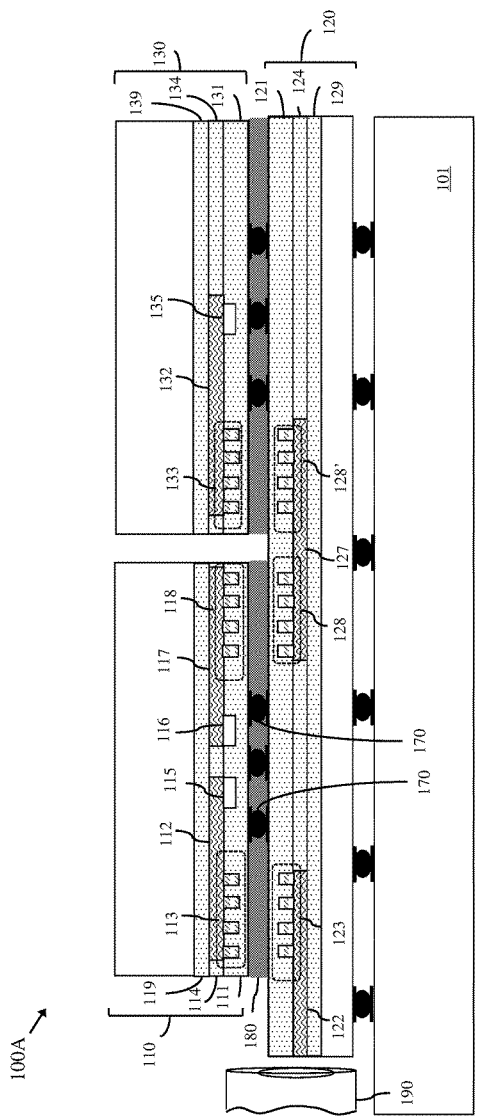
FIGS. 1A-1D are cross-section diagrams illustrating an embodiment of a multi-chip module with multiple integrated circuit chips mounted on an interposer.

As mentioned above, optoelectronic integrated circuit chips typically incorporate a variety of optical devices. For example, a grating coupler can receive a light signal from an off-chip optical fiber or a light source (e.g., a light-emitting diode (LED) or laser diode) can generate a light signal from an electronic signal. In either case, the light signal can be transmitted to an optical waveguide, which, in turn, transmits the light signal to a photodetector (also referred to herein as a photosensor or optical receiver). The photodetector can convert the light signal into an electronic signal for further processing. Such on-chip optical devices (e.g., grating couplers, light sources, optical waveguides and photodetectors) and off-chip optical devices (e.g., optical fibers) allow for the transmission of light signals (as opposed to electronic signals) and, thereby enable high bandwidth communication at an attractive price point. Unfortunately, the currently available electronic connections between integrated circuit chips in multi-chip modules (MCMs) cannot support this same high bandwidth communication.

In view of the foregoing, disclosed herein are multi-chip modules (MCMs) that allow for chip-to-chip transmission of light signals. Specifically, the disclosed MCMs can incorporate at least two components, which are attached (e.g., by interconnects). For example, in one MCM disclosed herein, the two components can be an integrated circuit chip and an interposer to which the integrated circuit chip and one or more additional integrated circuit chips are attached by interconnects. In another MCM disclosed herein, the two components can be two integrated circuit chips that are stacked and attached to each other by interconnects. In either case, the two components can each have an optical waveguide and a grating coupler coupled to one end of the optical waveguide. The grating couplers on the different components can be approximately vertically aligned, thereby allowing light signals to be transmitted between the optical waveguides on those different components. Also, disclosed herein are methods of forming such MCMs.

Generally, disclosed herein are various embodiments of multi-chip modules (MCM) (e.g., see MCMs 100A-100D of FIGS. 1A-1D and MCMs 200A-200D of FIGS. 2A-2D. FIGS. 1A-1D illustrate MCMs 100A-100D having multiple components including, but not limited to, integrated circuit chips 110 and 130 and an interposer 120 onto which the integrated circuit chips 110 and 130 are mounted; whereas FIGS. 2A-2D illustrate MCMs 200A-200D having multiple components including, but not limited to, integrated circuit chips 210 and 220 that are stacked vertically. In any case, each of these MCMs 100A-100D and MCMs 200A-200D incorporates a first component 110, 210 having a first optical waveguide 112, 212 and a first grating coupler 113, 213 coupled to the first optical waveguide 112, 212 at one end. Each of these MCMs 100A-100D and MCMs 200A-200D also incorporate a second component 120, 220 having a second optical waveguide 122, 222 and a second grating coupler 123, 223 coupled to the second optical waveguide 122, 222 at one end. The first component 110, 210 can be positioned relative to the second component 120, 220 and attached thereto by interconnects 170, 270 such that the first grating coupler 113, 213 is approximately vertically aligned with the second grating coupler 123, 223. With such a configuration, the vertical alignment of the first grating coupler 113, 213 of the first component 110, 210 and the second grating coupler 123, 223 of the second component 120, 220 allows transmission of light signals between the first optical waveguide 112, 212 and the second optical waveguide 122, 222.

More specifically, referring to FIGS. 1A-1D, disclosed herein are various MCMs 100A-100D, wherein multiple integrated circuit chips (e.g., see integrated circuit chip 110, which equates to the first component described above, and additional integrated circuit chip(s) 130) are electrically and physically connected to an interposer 120, which equates to the second component described above, using interconnects 170. The integrated circuit chip 110 and any additional integrated circuit chip(s) 130 can be electrically connected to each other and to a package substrate 101 through the interposer 120 and, particularly, through a combination of through substrate vias (TSVs) and wiring in the interposer 120 (not shown). The use of TSVs and wiring within an interposer to provide the electrical connections between integrated chips and with a package substrate is well known in the art and, thus, the details have been omitted from this specification in order to allow the reader to focus on the salient aspects of the disclosed structures.

The integrated circuit chip 110, any additional integrated circuit chip 130 and the interposer 120 can each be semiconductor-on-insulator (SOI) structures, as illustrated. Specifically, each of these components can have a semiconductor substrate (e.g., a silicon substrate or other suitable semiconductor substrate), an insulator layer 119, 129, 139 (e.g., a buried oxide (BOX) layer) on the semiconductor substrate, a device layer 114, 124, 134 (e.g., a semiconductor layer, such as a silicon layer, a III-V semiconductor layer or a II-VI semiconductor layer) on the insulator layer 119, 129, 139 and interlayer dielectric material 111, 121, 131 and, particularly, back end of the line (BEOL) interlayer dielectric material (including BEOL metal levels embedded therein (not shown)) on the device layer 114, 124, 134. The interlayer dielectric material 111, 121, 131 on each of the components 110, 120 and 130, respectively, can be the same material(s) or different material(s), as discussed in greater detail below.

The integrated circuit chip 110 can further have a first optical waveguide 112. As illustrated, the optical core of the first optical waveguide 112 can, for example, be defined within the device layer 114 by shallow trench isolation (STI) regions. Thus, depending upon the semiconductor material of the device layer 114, this first optical waveguide 112 can be a silicon optical waveguide, a III-V semiconductor optical waveguide or a II-VI semiconductor optical waveguide. In this case, the insulator layer 119, STI regions and interlayer dielectric material 111 that surround the optical core can function as the cladding material for the first optical waveguide 112. It should be understood, that any other suitable optical core/cladding configuration could alternatively be used for the first optical waveguide. For example, although not shown, the optical core of the first optical waveguide could be defined within a dielectric layer on the integrated circuit chip 110 (e.g., within a nitride layer) and other dielectric materials (e.g., oxide layers) with a smaller refractive index could function as the cladding material.

Figure 3B:
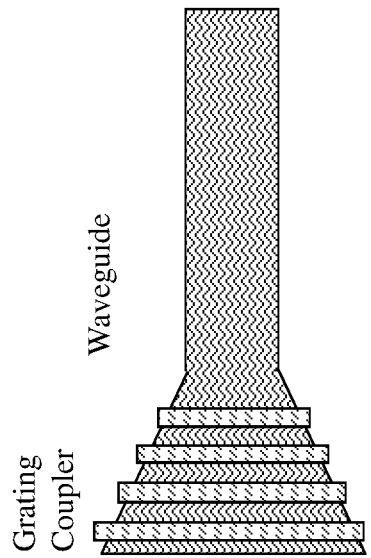
FIG. 3B is a top view diagram illustrating exemplary curved fin shapes for a grating coupler; and, FIG. 4 is a flow diagram illustrating methods of forming the above-described multi-chip modules.
Figure 3A:
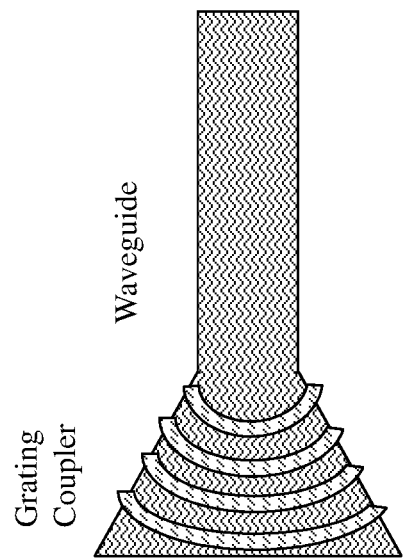
FIG. 3A is a top view diagram illustrating exemplary linear fin shapes for a grating coupler.

The integrated circuit chip 110 can further have a first grating coupler 113 coupled to a surface of the first optical waveguide 112 at one end. The first grating coupler 113 can incorporate a plurality of essentially parallel fin structures (i.e., essentially parallel elongated narrow bodies). For purposes of illustration, only four fin structures are shown. However, it should be understood that the figures are not intended to be limiting and that the number of fin structures can range from 3 to 20 or more. FIGS. 3A and 3B are top view diagrams illustrating exemplary grating coupler configurations and, specifically, exemplary fin structure shapes relative to an optical waveguide. Specifically, as illustrated in FIG. 3A, the fin structures of the grating coupler can be essentially linear and perpendicular relative to the optical waveguide and, optionally, the lengths of the fin structures can increase as the distance from the optical waveguide increases. Alternatively, as illustrated in FIG. 3B, the fin structures can be curved and concave relative to the end of the optical waveguide and, again, the lengths of the fin structures can, optionally, increase as the distance from the optical waveguide increases.

It should be noted that the fin structures of the first grating coupler 113 could be made of one or more semiconductor materials (e.g., silicon, polysilicon or other suitable semiconductor material), one or more dielectric materials (e.g., silicon nitride, silicon oxynitride, or other suitable dielectric materials) or combinations thereof. Finally, it should be noted that, for purposes of illustration, the first grating coupler 113 is shown as being positioned on a surface of the first optical waveguide 112 adjacent to the interlayer dielectric material 111 (i.e., between the first optical waveguide 112 and the back end of the line (BEOL) metal levels for the integrated circuit chip 110). However, it should be understood that, alternatively, the first grating coupler 113 could be positioned on the opposite surface of the first optical waveguide 112 adjacent to the insulator layer 119. In any case, the configuration of the fin structures of the first grating coupler 113, the material(s) used for those fin structures, and the positioning of the first grating coupler 113 relative to the first optical waveguide 112 (e.g., on the surface of the first optical waveguide 112 adjacent to the interlayer dielectric material 111 (as shown) or on the surface of the first optical waveguide adjacent to the insulator layer (not shown)) can be predetermined for the purpose of directing a light signal into or away from the first optical waveguide 112.

The interposer 120 can have a second optical waveguide 122. As illustrated, an optical core of the second optical waveguide 122 can, for example, be defined within the device layer 124 by shallow trench isolation (STI) regions. Thus, depending upon the semiconductor material of the device layer 124, this second optical waveguide 122 can be a silicon waveguide, a III-V semiconductor waveguide or a II-VI semiconductor waveguide and can be the same material as or different from the first optical waveguide 112 of the integrated circuit chip 110. In this case, the insulator layer 129, STI regions and interlayer dielectric material 121 that surround the optical core can function as the cladding material for the second optical waveguide 122. It should be understood, that any other suitable optical core/cladding configuration could alternatively be used for the second optical waveguide. For example, although not shown, the optical core of the second optical waveguide could be defined within a dielectric layer on the interposer 120 (e.g., within a nitride layer) and other dielectric materials (e.g., oxide layers) with a smaller refractive index could function as the cladding material.

The interposer 120 can further have a second grating coupler 123 coupled to a surface of the second optical waveguide 122 at one end. The positioning of the integrated circuit chip 110 relative to the interposer 120 can be such that the first grating coupler 113 is approximately vertically aligned with the second grating coupler 123 (see more detailed discussion regarding grating coupler alignment below). Specifically, the second grating coupler 123 can incorporate a plurality of essentially parallel fin structures (i.e., essentially parallel elongated narrow bodies). The number of the fin structures in the second grating coupler 123 as well as the configuration of the fin structures in the second grating coupler 123 should be identical to the number of fin structures and configuration of the fin structures in the first grating coupler 113 with each fin structure of the second grating coupler 123 being vertically aligned with a corresponding fin structure of the first grating coupler 113. It should be noted that if the lengths of the fin structures vary, as shown in FIGS. 3A and 3B, the longest fin structure of the first grating coupler 113 will be approximately aligned with the shortest fin structure of the second grating coupler 123 and vice versa.

It should be noted that, although the grating couplers are referred to as being approximately vertically aligned, there can be a slight offset in the vertical alignment and the amount of this slight offset can depend upon the angle the light ray will travel to the chip. Specifically, the light receiving grating coupler can optimally be placed $X*\sin(Y°)$ offset from directly aligned with the light transmitting grating coupler, when X is the vertical distance between the grating couplers and Y is the angle the light will travel to the chip. Thus, for example, in a design where the grating couplers are 10-30 μm in size, where the transmitting grating coupler sends the light at a 20° angle from vertical and where the grating coupler to grating coupler distance is relatively small (e.g., 6 μm), the offset would be 6 μm*sin(20)=2 μm which is much smaller than the 10-30 μm grating size.

It should be noted that the fin structures of the second grating coupler 123 could be made of one or more semiconductor materials (e.g., silicon, polysilicon or other suitable semiconductor material), one or more dielectric materials (e.g., silicon nitride, silicon oxynitride, or other suitable dielectric materials) or combinations thereof. Preferably, the materials of the fin structures of the first grating coupler 113 will be the same as the materials of the fin structures of the second grating coupler 123 or at least optically equivalent materials. Finally, it should be noted that, for purposes of illustration, the second grating coupler 123 is shown as being positioned on a surface of the second optical waveguide 122 adjacent to the interlayer dielectric material 121 (i.e., between the second optical waveguide 122 and the back end of the line (BEOL) metal levels for the interposer 120). However, it should be understood that, alternatively, the second grating coupler 123 could be positioned on the opposite surface of the second optical waveguide 122 adjacent to the insulator layer 129. In any case, the configuration of the fin structures of the second grating coupler 123, the material(s) used for those fin structures, and the positioning of the second grating coupler 123 relative to the second optical waveguide 122 (e.g., on the surface of the second optical waveguide 122 adjacent to the interlayer dielectric material 121 (as shown) or on the surface of the second optical waveguide adjacent to the insulator layer (not shown)) can be predetermined for the purpose of directing a light signal into or away from the second optical waveguide 122.

Interconnects (e.g., solder bumps) can extend between an outermost surface of the interlayer dielectric material 111 of the integrated circuit chip 110 and the outermost surface of the interlayer dielectric material 121 of the interposer 120, thereby physically and electrically connecting the integrated circuit chip 110 to the interposer 120. Again, as mentioned above, the integrated circuit chip 110 should be positioned relative to the interposer 120 such that the first grating coupler 113 is approximately vertically aligned with the second grating coupler 123.

In MCMs 100A-100D having a configuration, as described above, the vertical alignment of the first grating coupler 113 of the integrated circuit chip 110 and the second grating coupler 123 of the interposer 120 allows transmission of light signals and, particularly, light signals of any number of different frequencies between the first optical waveguide 112 on the integrated circuit chip 110 and the second optical waveguide 122 on the interposer 120. For example, the second optical waveguide 122 on the interposer 120 can receive, at an end opposite the second grating coupler 123, a light signal from an off-chip optical fiber 190. This light signal can be propagated along the second optical waveguide 122 and through the second grating coupler 123. The second grating coupler 123 can then direct the light signal away from the second optical waveguide 122 and, particularly, away from the interposer 120 to the first grating coupler 113 on the integrated circuit chip 110. The first grating coupler 113 can then direct the light signal into the first optical waveguide 112 and the first optical waveguide 112 can propagate the light signal to an on-chip optical device 115, such as a photodetector, which can convert the light signal into an electronic signal for further processing by electronic devices (not shown) on the integrated circuit chip 110.

It should be noted that additional optical devices (e.g., additional light sources and/or photosensors), additional optical waveguides and additional grating couplers on the integrated circuit chip 110, interposer 120 and any additional integrated circuit chip 130 can allow for further transmission of light signals between the various integrated circuit chips mounted on the interposer (i.e., can allow for chip-to-chip transmission of light signals). For example, the interposer 120 can further have an optical waveguide 127 and grating couplers 128, 128' coupled to opposite ends of the optical waveguide 127; the integrated circuit chip 110 can further have an optical waveguide 117 and a grating coupler 118 and an optical device 116 (e.g., a light source) coupled to opposite ends of the optical waveguide 117, respectively; and the additional integrated circuit chip 130 can further have an optical waveguide 132 and a grating coupler 133 and an optical device 135 (e.g., a photodetector) coupled to opposite ends of the optical waveguide 132. The grating coupler 128 on the optical waveguide 127 of the interposer 120 can be approximately vertically aligned with the grating coupler 118 on the optical waveguide 117 of the integrated circuit chip 110 and, similarly, the grating coupler 128' on the optical waveguide 127 of the interposer 120 can be approximately vertically aligned with the grating coupler 133 on the optical waveguide 132 of the additional integrated circuit chip 130. Thus, a light signal generated at the light source 116 on the integrated circuit chip 110 can be propagated through the optical waveguide 117, grating coupler 118, grating coupler 128, optical waveguide 127, grating coupler 128', grating coupler 133 and optical waveguide 132 and received by the photodetector 135.

The MCMs 100A-100D can further have fill material 180 between the integrated circuit chip(s) 110, 130 and the interposer 120. This fill material can be, for example, a thermal compound (e.g., thermal paste, gel or grease) for purposes of heat removal. The fill material 180 can be optically transparent fill material (i.e., fill material that is known to be essentially transparent to light signals at desired frequencies) (e.g., see MCM 100A of FIG. 1A and MCM 100B of FIG. 1B). Alternatively, the fill material 180 can be optically opaque fill material (e.g., see MCM 100C of FIG. 1C and MCM 100D of FIG. 1D). It should be noted that, if the fill material is optically opaque (i.e., not optically transparent), then at least one barrier 181 (e.g., a dielectric spacer) can extend from the outermost surface of the interlayer dielectric material 121 of the interposer 120 to the outermost surface of the interlayer dielectric material of each of the integrated circuit chips. Each barrier 181 can encircle a transmission region between vertically aligned grating couplers (e.g., between the first grating coupler 113 of the integrated circuit chip 110 and the second grating coupler 123 of the interposer 120, etc.) to prevent the fill material from entering the transmission region when deposited between the integrated circuit chips 110, 130 and the interposer 120. Thus, after the fill material 180 is deposited, the fill material 180 has an opening 186 between the vertically aligned grating couplers (e.g., between the first grating coupler 113 of the integrated circuit chip 110 and the second grating coupler 123 of the interposer 120, etc.), thereby preventing obstruction of light signal transmission between the vertically aligned grating couplers (e.g., see MCM 100C of FIG. 1C and MCM 100D of FIG. 1D).

Figure 1B:
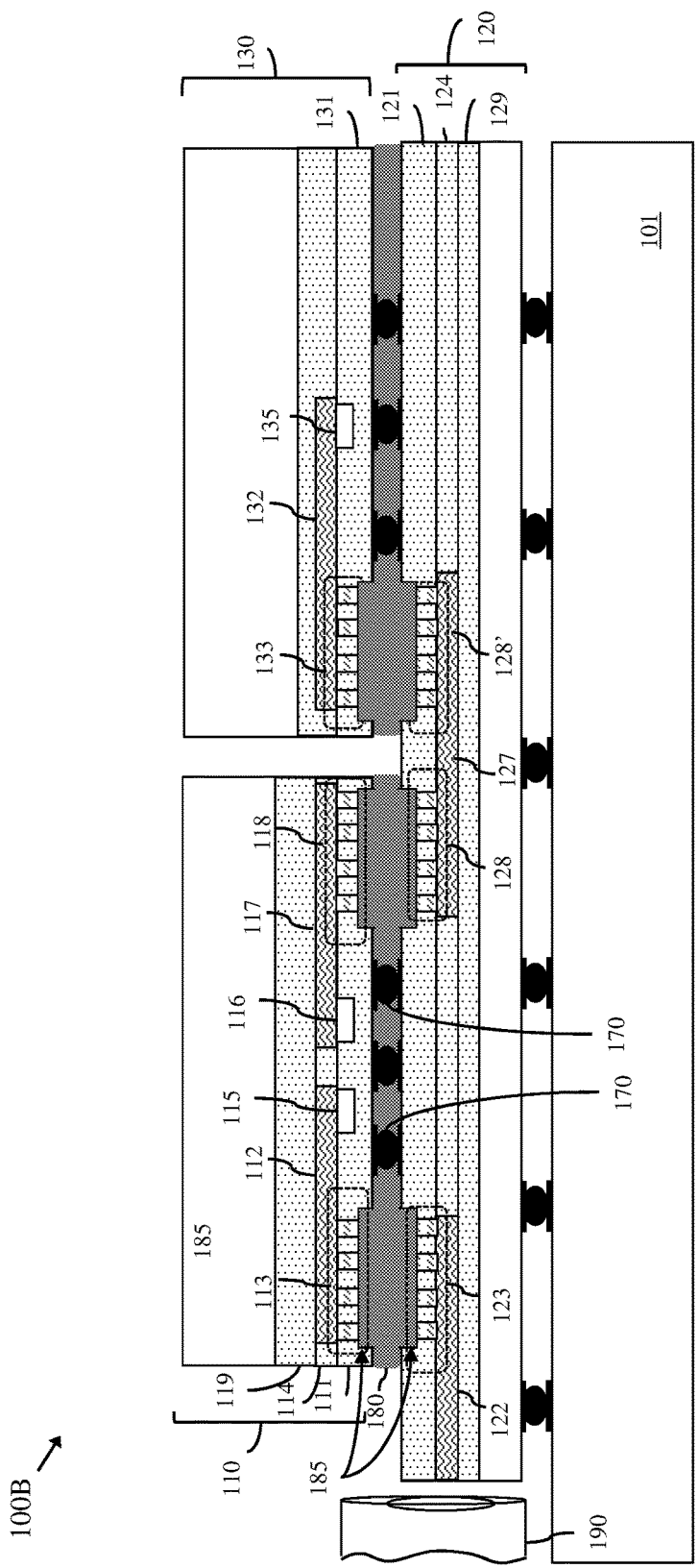
Figure 1C:
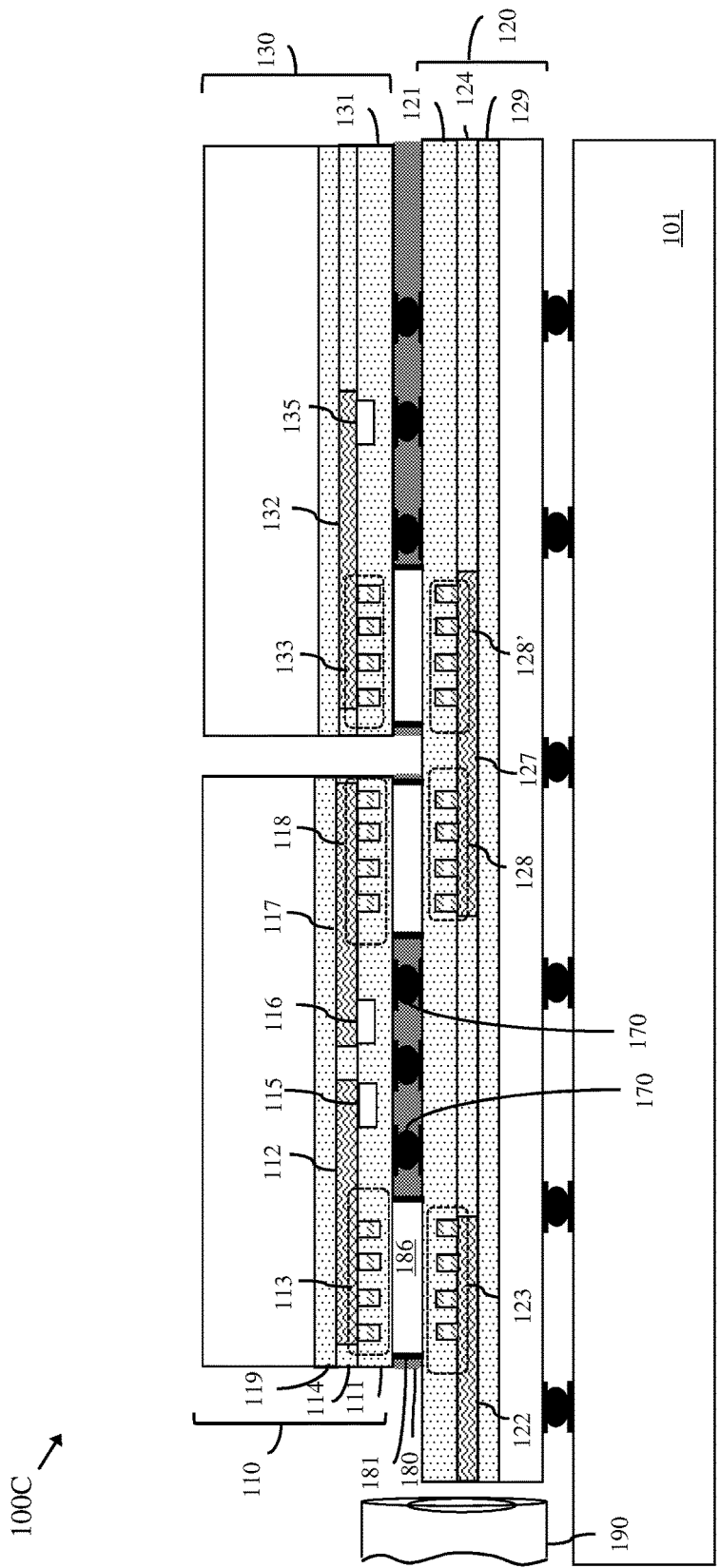
Figure 1D:
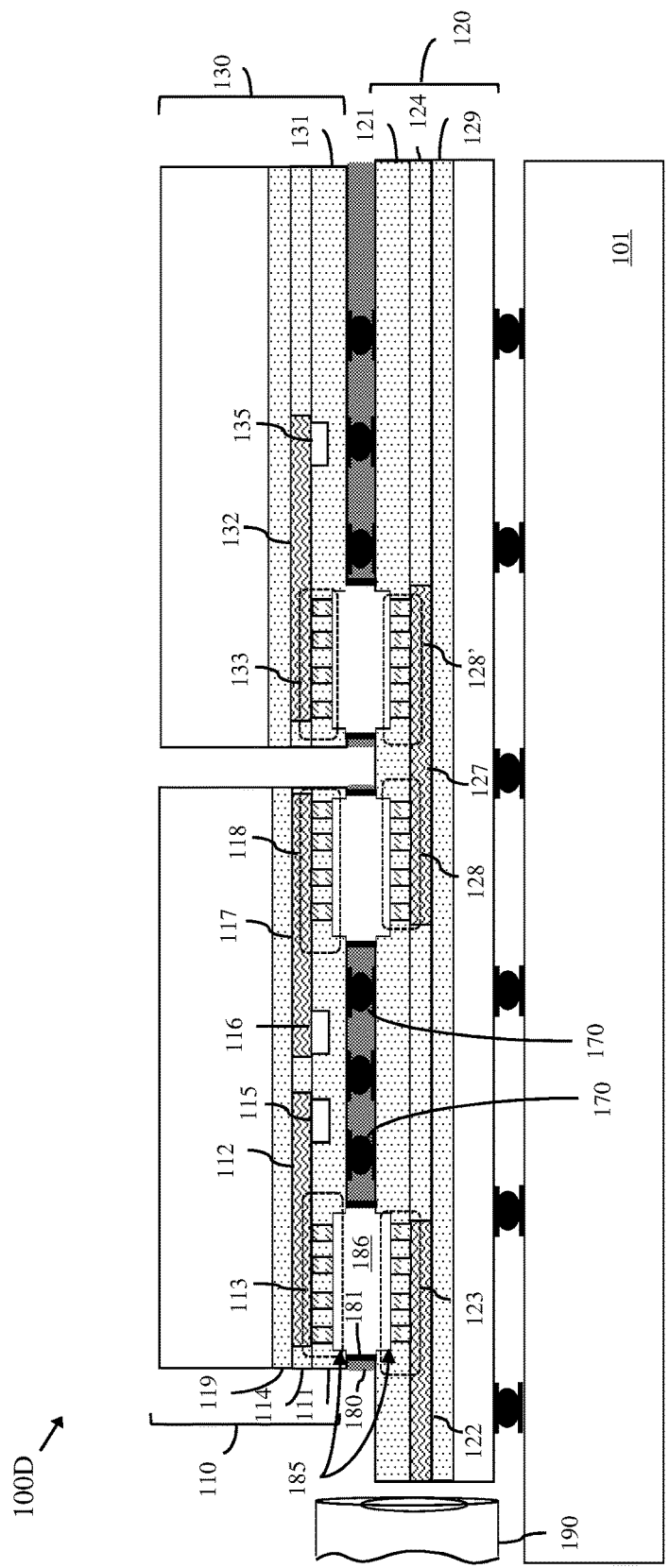

Additionally, in the MCMs 100A-100D, the interlayer dielectric material 111, 131 of the integrated circuit chips 110, 130 can be either the same as, or optically equivalent to, the interlayer dielectric material 121 of the interposer 120 and can be transparent to light signals at the desired frequencies (e.g., see MCM 100A of FIG. 1A and MCM 100C of FIG. 1C). Alternatively, the interlayer dielectric materials 111, 121, 131 can be different and, particularly, exhibit different optical properties or can be optically opaque (e.g., see MCM 100B of FIG. 1B and MCM 100D of FIG. 1D). It should be noted that, if the interlayer dielectric materials 111, 131 on the integrated circuit chips 110, 130 are neither the same as, nor optically equivalent to, the interlayer dielectric material 121 of the interposer 120 or if the interlayer dielectric materials 111, 121, 131 are optically opaque, then the interlayer dielectric materials 111, 121, 131 on the integrated circuit chips 110, 130 and on the interposer 120 can have openings 185 that extend vertically to the grating couplers and that prevent the obstruction of light signal transmission between vertically aligned grating couplers, such as the first grating coupler 113 of the integrated circuit chip 110 and the second grating coupler 123 of the interposer 120, etc. (e.g., see MCM 100B of FIG. 1B and MCM 100D of FIG. 1D).

Referring to FIGS. 2A-2D, also disclosed herein are MCMs 200A-200D, wherein multiple integrated circuit chips (e.g., a first integrated circuit chip 210, which equates to the first component described above, and a second integrated circuit chip 220, which equates to the second component described above) are stacked vertically and electrically and physically connected by interconnects 270. The stack of integrated circuit chips 210, 220 can be mounted on a substrate 201 (e.g., on a package substrate or, alternatively, on an interposer that is mounted on a package substrate).

The first integrated circuit chip 210 and the second integrated circuit chip 220 can each be semiconductor-on-insulator (SOI) structures, as illustrated. Specifically, each of these integrated circuit chips can have a semiconductor substrate (e.g., a silicon substrate or other suitable semiconductor substrate), an insulator layer 219, 229 (e.g., a buried oxide (BOX) layer) on the semiconductor substrate, a device layer 214, 224 (e.g., a semiconductor layer, such as a silicon layer, a III-V semiconductor layer or a II-VI semiconductor layer) on the insulator layer 219, 229 and interlayer dielectric material 211, 221 and, particularly, back end of the line (BEOL) interlayer dielectric material (including BEOL metal levels embedded therein (not shown)) on the device layer 214, 224.

The first integrated circuit chip 210 can further have a first optical waveguide 212. As illustrated, the optical core of the first optical waveguide 212 can, for example, be defined within the device layer 214 by shallow trench isolation (STI) regions. Thus, depending upon the semiconductor material of the device layer 214, this first optical waveguide 212 can be a silicon optical waveguide, a III-V semiconductor optical waveguide or a II-VI semiconductor optical waveguide. In this case, the insulator layer 219, STI regions and interlayer dielectric material 211 that surround the optical core can function as the cladding material for the first optical waveguide 212. It should be understood, that any other suitable optical core/cladding configuration could be used. For example, although not shown, the optical core of the first optical waveguide 212 could be defined within a dielectric layer on the integrated circuit chip 210 (e.g., within a nitride layer) and other dielectric materials (e.g., oxide layers) with a smaller refractive index could function as the cladding material.

The first integrated circuit chip 210 can further have a first grating coupler 213 coupled to a surface of the first optical waveguide 212 at one end. The first grating coupler 213 can incorporate a plurality of essentially parallel fin structures (i.e., essentially parallel elongated narrow bodies). For purposes of illustration, only four fin structures are shown. However, it should be understood that the figures are not intended to be limiting and that the number of fin structures can range from 3 to 20 or more. FIGS. 3A and 3B are top view diagrams illustrating exemplary grating coupler configurations and, specifically, exemplary fin structure shapes relative to an optical waveguide. Specifically, as illustrated in FIG. 3A, the fin structures can be essentially linear and perpendicular relative to the optical waveguide and, optionally, the lengths of the fin structures can increase as the distance from the optical waveguide increases. Alternatively, as illustrated in FIG. 3B, the fin structures can be curved and concave relative to the end of the optical waveguide and, again, the lengths of the fin structures can, optionally, increase as the distance from the optical waveguide increases.

It should be noted that the fin structures of the first grating coupler 213 could be made of one or more semiconductor materials (e.g., silicon, polysilicon or other suitable semiconductor material), one or more dielectric materials (e.g., silicon nitride, silicon oxynitride, or other suitable dielectric materials) or combinations thereof. Finally, it should be noted that, for purposes of illustration, the first grating coupler 213 is shown as being positioned on a surface of the first optical waveguide 212 adjacent to the interlayer dielectric material 211 (i.e., between the first optical waveguide 212 and the back end of the line (BEOL) metal levels for the first integrated circuit chip 210). However, it should be understood that, alternatively, the first grating coupler 213 could be positioned on the opposite surface of the first optical waveguide 212 adjacent to the insulator layer 219. In any case, the configuration of the fin structures of the first grating coupler 213, the material(s) used for those fin structures, and the positioning of the first grating coupler 213 relative to the first optical waveguide 212 (e.g., on the surface of the first optical waveguide 112 adjacent to the interlayer dielectric material 211 (as shown) or on the surface of the first optical waveguide adjacent to the insulator layer (not shown)) can be predetermined for the purpose of directing a light signal into or away from the first optical waveguide 212.

The second integrated circuit chip 220 can have a second optical waveguide 222. As illustrated, the optical core of the second optical waveguide 222 can, for example, be defined within the device layer 224 by shallow trench isolation (STI) regions. Thus, depending upon the semiconductor material of the device layer 224, this second optical waveguide 222 can be a silicon waveguide, a III-V semiconductor waveguide or a II-VI semiconductor waveguide and can be the same material as or different from the first optical waveguide 212 of the first integrated circuit chip 210. In this case, the insulator layer 229, STI regions and interlayer dielectric material 221 that surround the optical core can function as the cladding material for the second optical waveguide 222. It should be understood, that any other suitable optical core/cladding configuration could alternatively be used for the second optical waveguide. For example, although not shown, the optical core of the second optical waveguide could be defined within a dielectric layer on the second integrated circuit chip 220 (e.g., within a nitride layer) and other dielectric materials (e.g., oxide layers) with a smaller refractive index could function as the cladding material.

The second integrated circuit chip 220 can further have a second grating coupler 223 coupled to a surface of the second optical waveguide 222 at one end. The positioning of the first integrated circuit chip 210 relative to the second integrated circuit chip 220 can be such that the first grating coupler 213 is approximately vertically aligned with the second grating coupler 223 (see more detailed discussion regarding grating coupler alignment below). Specifically, the second grating coupler 223 can incorporate a plurality of essentially parallel fin structures (i.e., essentially parallel elongated narrow bodies). The number of the fin structures in the second grating coupler 223 as well as the configuration of the fin structures in the second grating coupler 223 should be identical to the number of fin structures and configuration of the fin structures in the first grating coupler 213 with each fin structure of the second grating coupler 223 being vertically aligned with a corresponding fin structure of the first grating coupler 213. It should be noted that if the lengths of the fin structures vary, as shown in FIGS. 3A and 3B, the longest fin structure of the first grating coupler 213 will be approximately aligned with the shortest fin structure of the second grating coupler 223 and vice versa.

Again, it should be noted that, although the grating couplers are referred to as being approximately vertically aligned, optimally, there may be a slight offset in the vertical alignment and the amount of that offset will depend upon the angle the light ray will travel to the chip. That is, the light receiving grating coupler will optimally be placed $X*\sin(Y°)$ offset from directly aligned with the light transmitting grating coupler, when X is the vertical distance between the grating couplers and Y is the angle the light will travel to the chip. Thus, for example, in a design where the grating couplers are 10-30 μm in size, where the transmitting grating coupler sends the light at a 20° angle from vertical and where the grating coupler to grating coupler distance is relatively small (e.g., 6 μm), the offset would be 6 μm*sin (20)=2 μm which is much smaller than the 10-30 μm grating size.

It should be noted that the fin structures of the second grating coupler 223 could be made of one or more semiconductor materials (e.g., silicon, polysilicon or other suitable semiconductor material), one or more dielectric materials (e.g., silicon nitride, silicon oxynitride, or other suitable dielectric materials) or combinations thereof. Preferably, the materials of the fin structures of the first grating coupler 213 will be the same as the materials of the fin structures of the second grating coupler 223 or at least optically equivalent materials. Finally, it should be noted that, for purposes of illustration, the second grating coupler 223 is shown as being positioned on a surface of the second optical waveguide 222 adjacent to the interlayer dielectric material 221 (i.e., between the second optical waveguide 222 and the back end of the line (BEOL) metal levels for the second integrated circuit chip 220). However, it should be understood that, alternatively, the second grating coupler 223 could be positioned on the opposite surface of the second optical waveguide 222 adjacent to the insulator layer 229. In any case, the configuration of the fin structures of the second grating coupler 223, the material(s) used for those fin structures, and the positioning of the second grating coupler 223 relative to the second optical waveguide 222 (e.g., on the surface of the second optical waveguide 222 adjacent to the interlayer dielectric material 221 (as shown) or on the surface of the second optical waveguide adjacent to the insulator layer (not shown)) can be predetermined for the purpose of directing a light signal into or away from the second optical waveguide 222.

Interconnects (e.g., solder bumps) can extend between an outermost surface of the interlayer dielectric material 211 of the first integrated circuit chip 210 and the outermost surface of the interlayer dielectric material 221 of the second integrated circuit chip 220, thereby physically and electrically connecting the first integrated circuit chip 210 to the second integrated circuit chip 220. Again, as mentioned above, the first integrated circuit chip 210 should be positioned relative to the second integrated circuit chip 220 such that the first grating coupler 213 is approximately vertically aligned with the second grating coupler 223.

In each of the MCMs 200A-200D, as described above, the vertical alignment of the first grating coupler 213 of the first integrated circuit chip 210 and the second grating coupler 223 of the second integrated circuit chip 220 allows transmission of light signals and, particularly, light signals of any number of different frequencies between the first optical waveguide 212 on the first integrated circuit chip 210 and the second optical waveguide 222 on the second integrated circuit chip 220. For example, the second optical waveguide 222 on the second integrated circuit chip 220 can receive, at an end opposite the second grating coupler 223, a light signal from an on-chip optical device 225 (e.g., a light source, which can generate a light signal). This light signal can be propagated along the second optical waveguide 222 and through the second grating coupler 223. The second grating coupler 223 can then direct the light signal away from the second optical waveguide 222 and, particularly, away from the second integrated circuit chip 220 to the first grating coupler 213 on the first integrated circuit chip 210. The first grating coupler 213 can then direct the light signal into the first optical waveguide 212 and the first optical waveguide 212 can propagate the light signal to an on-chip optical device 215 (e.g., a photodetector, which can convert the light signal into an electronic signal for further processing by electronic devices (not shown) on the first integrated circuit chip 210).

The MCMs 200A-200D can further have fill material 280 between the first integrated circuit chip 210 and the second integrated circuit chip 220. This fill material can be, for example, a thermal compound (e.g., thermal paste, gel or grease) for purposes of heat removal. The fill material 280 can be optically transparent fill material (i.e., fill material that is known to be essentially transparent to light signals at desired frequencies) (e.g., see MCM 200A of FIG. 2A and MCM 200B of FIG. 2B). Alternatively, the fill material 280 can be optically opaque (e.g., see MCM 200C of FIG. 2C and MCM 200D of FIG. 2D). It should be noted that, if the fill material is optically opaque (i.e., not optically transparent), then at least one barrier 281 (e.g., a dielectric spacer) can extend from the outermost surface of the interlayer dielectric material 221 of the second integrated circuit chip 220 to the outermost surface of the interlayer dielectric material 211 of the first integrated circuit chip 210. Each barrier 281 can encircle a transmission region between vertically aligned grating couplers (e.g., between the first grating coupler 213 of the first integrated circuit chip 210 and the second grating coupler 223 of the second integrated circuit chip 220, etc.) to prevent the fill material from entering the transmission region when deposited between the first integrated circuit chip 210 and the second integrated circuit 220. Thus, after the fill material 280 is deposited, the fill material 280 has an opening 286 between the vertically aligned grating couplers (e.g., between the first grating coupler 213 of the first integrated circuit chip 210 and the second grating coupler 223 of the second integrated circuit chip 210, etc.), thereby preventing obstruction of light signal transmission between the vertically aligned grating couplers (e.g., see MCM 200C of FIG. 2C and MCM 200D of FIG. 2D).

Figure 2A:
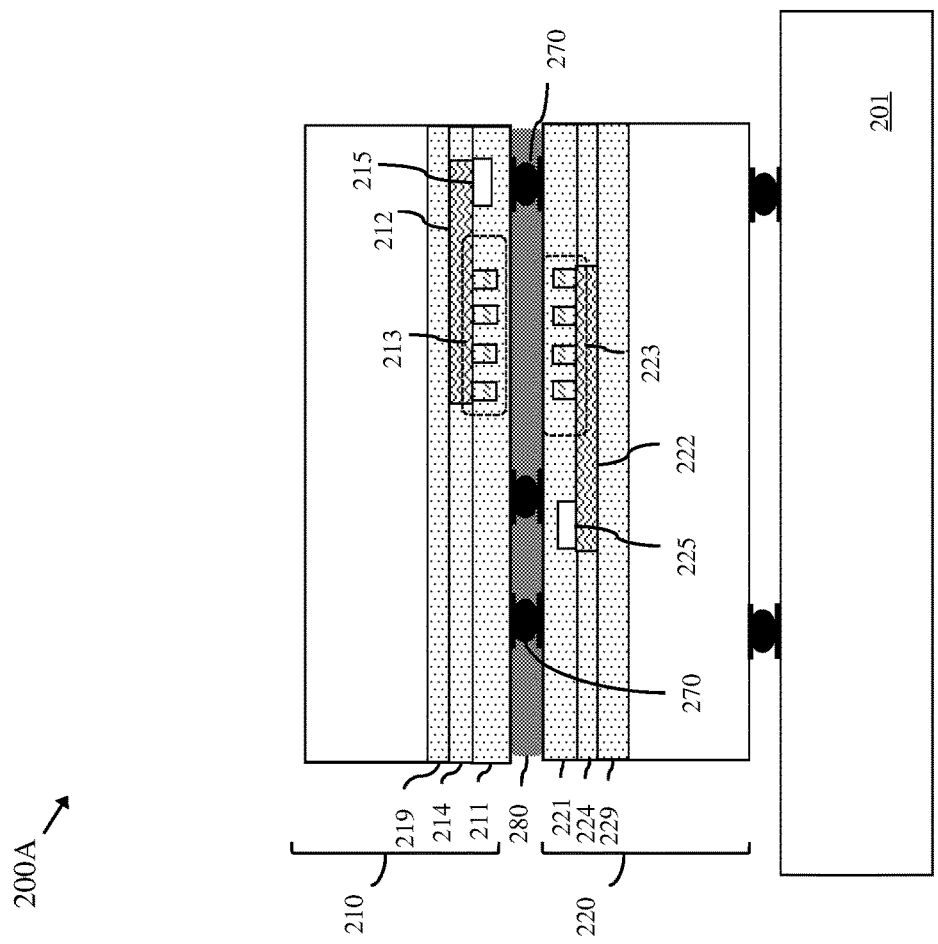
FIGS. 2A-2D are cross-section diagrams illustrating an embodiment of a multi-chip module with multiple stacked integrated circuit chips.
Figure 2B:
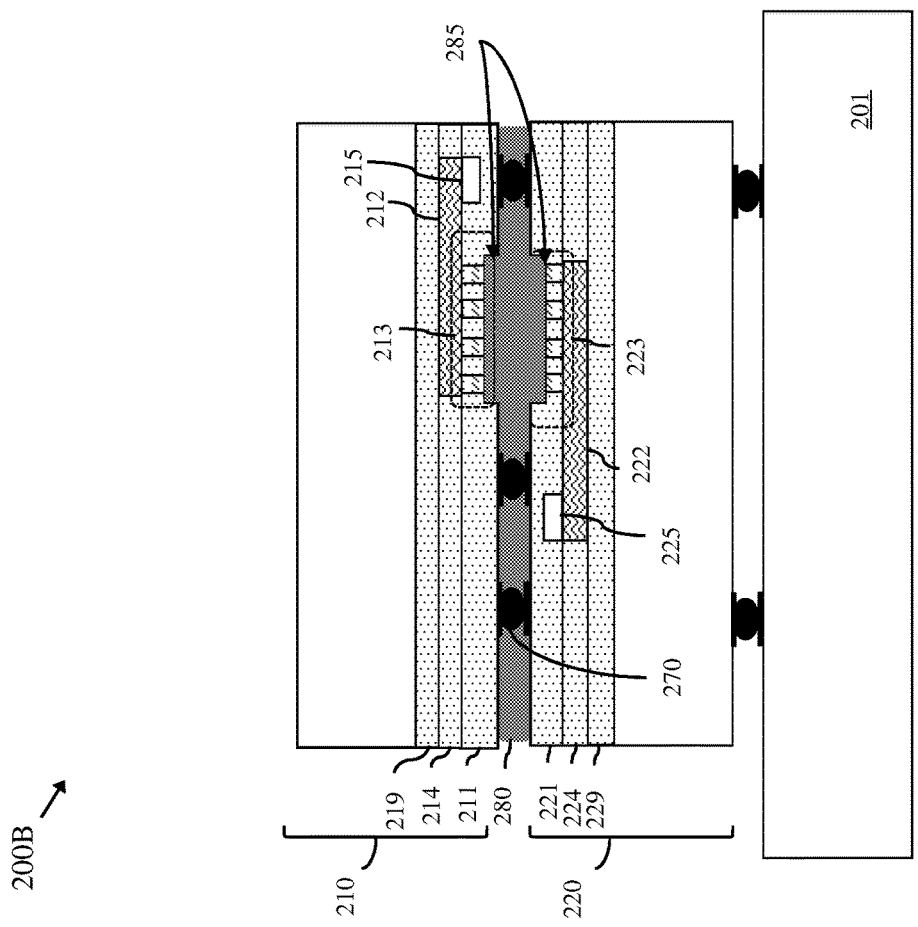
Figure 2C:
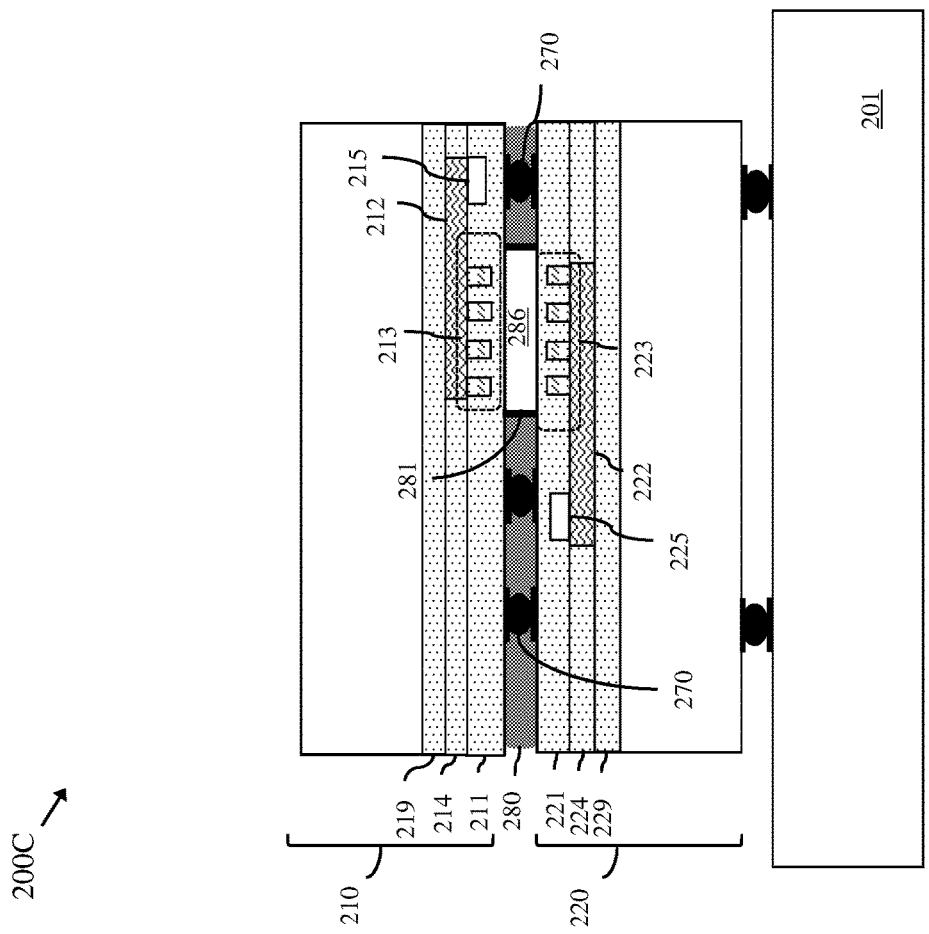
Figure 2D:
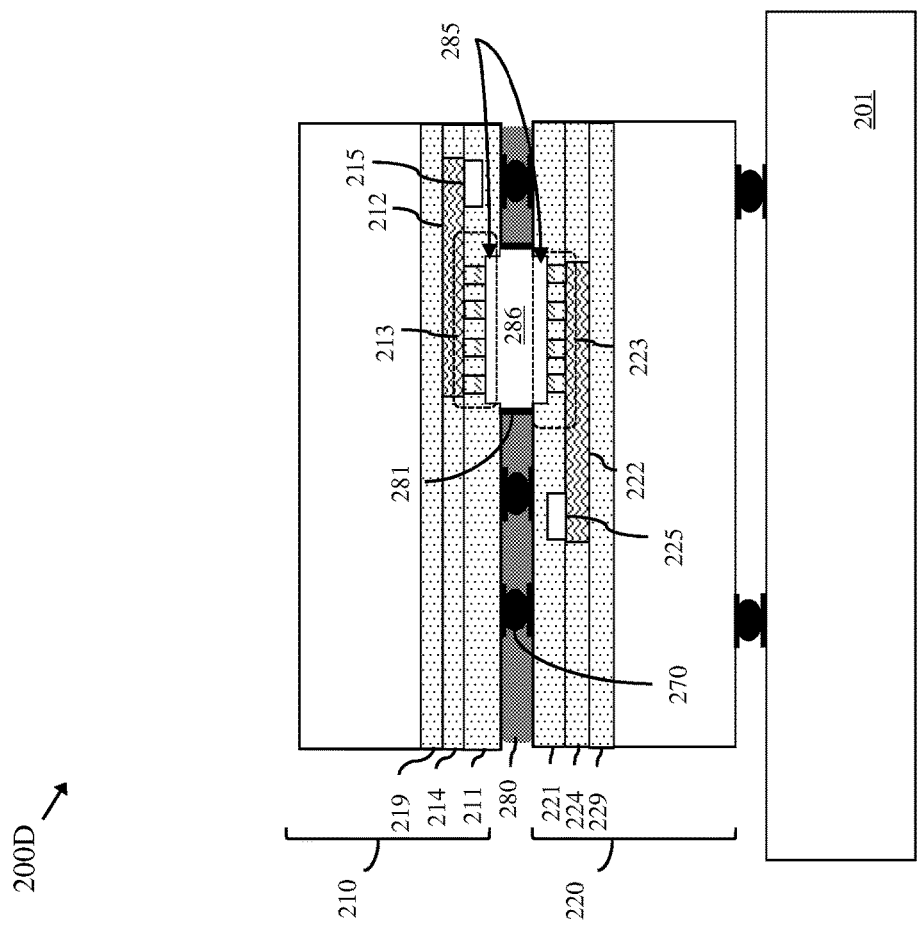

Additionally, in the MCMs 200A-200D, the interlayer dielectric material 211 of the first integrated circuit chip 210 can be either the same as, or optically equivalent to, the interlayer dielectric material 221 of the second integrated circuit chip 220 and can be transparent to light signals at the desired frequencies (e.g., see MCM 200A of FIG. 2A and MCM 200C of FIG. 2C). Alternatively, the interlayer dielectric materials 211, 221 on the integrated circuit chips 210, 220 can be different and, particularly, can exhibit different optical properties or can be optically opaque (e.g., see MCM 200B of FIG. 2B and MCM 200D of FIG. 2D). It should be noted that, if the interlayer dielectric material 211 on the first integrated circuit chip 210 is neither the same as, nor optically equivalent to, the interlayer dielectric material 221 on the second integrated circuit chip 220 or if the interlayer dielectric materials 211, 221 are optically opaque, then the interlayer dielectric materials 211, 221 can have openings 282 that extend vertically to the grating couplers and that prevent the obstruction of light signal transmission between vertically aligned grating couplers, such as the first grating coupler 213 of the first integrated circuit chip 210 and the second grating coupler 223 of the second integrated circuit chip 220, etc. (e.g., see MCM 200B of FIG. 2B and MCM 200D of FIG. 2D).

Figure 4:
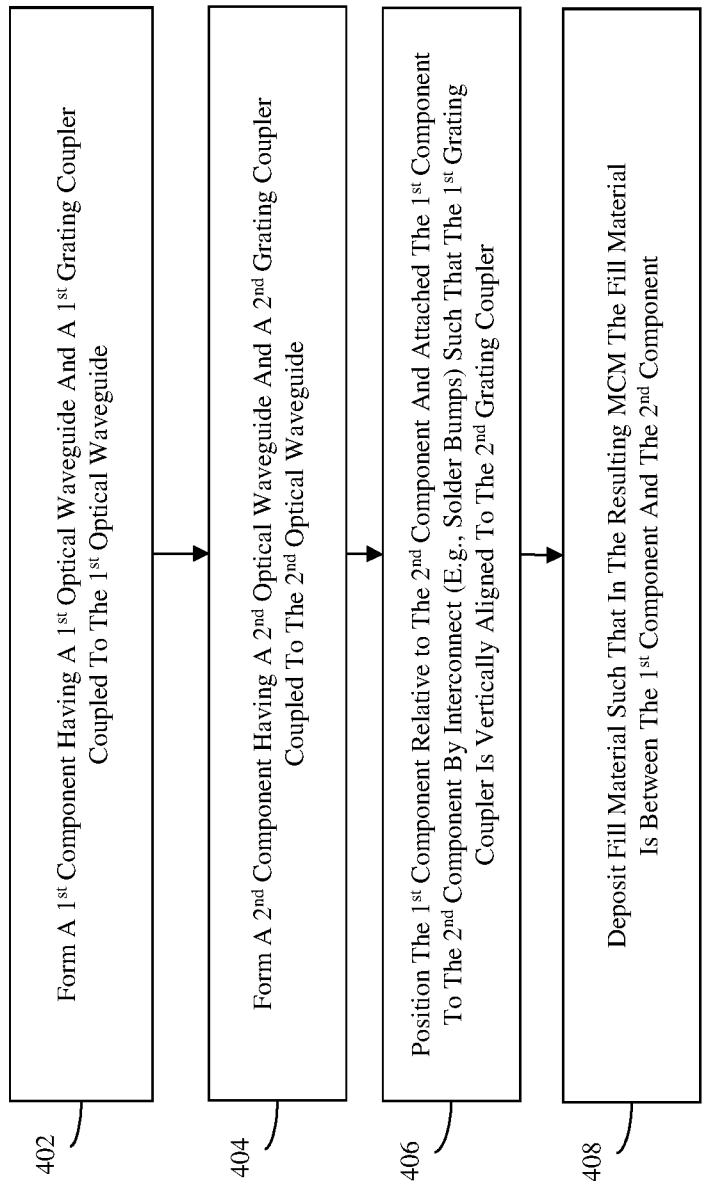

Referring to the flow diagram of FIG. 4, also disclosed herein are methods of forming the above-described MCMs 100A-100D of FIGS. 1A-1D and MCMs 200A-200D of FIGS. 2A-2D. In the methods, a first component can be formed (402). Specifically, the first component can be formed as a semiconductor-on-insulator (SOI) structure. A semiconductor-on-insulator (SOI) wafer can be provided. This wafer can have semiconductor substrate (e.g., a silicon substrate or other suitable semiconductor substrate), an insulator layer (e.g., a buried oxide (BOX) layer) on the semiconductor substrate, and a device layer (e.g., a semiconductor layer, such as a silicon layer, a III-V semiconductor layer or a II-VI semiconductor layer) on the insulator layer. A first optical waveguide can be formed on the first component. For example, the optical core of a first optical waveguide can be defined in the device layer by shallow trench isolation regions. In this case, the insulator layer, STI regions and interlayer dielectric material that surround the optical core can function as the cladding material for the first optical waveguide. It should be understood that any other suitable optical core/cladding configuration could alternatively be formed. For example, although not shown, the optical core of the first optical waveguide could be defined within a dielectric layer on the first component (e.g., within a nitride layer) and other dielectric materials (e.g., oxide layers) with a smaller refractive index could function as the cladding material. Additionally, a first grating coupler can be formed so that it is coupled to the first optical waveguide at one end. The first grating coupler can incorporate a plurality of essentially parallel fin structures (i.e., essentially parallel elongated narrow bodies). An optical device (e.g., a photodetector) can be formed such that it is coupled to the optical waveguide at the opposite end. Interlayer dielectric material and, particularly, back end of the line (BEOL) interlayer dielectric material can be formed adjacent the first optical waveguide and metal levels (not shown) can be embedded in the BEOL interlayer dielectric material.

Additionally, a second component can be formed (403). Specifically, the second component can be formed as a semiconductor-on-insulator (SOI) structure. A semiconductor-on-insulator (SOI) wafer can be provided. This wafer can have a semiconductor substrate (e.g., a silicon substrate or other suitable semiconductor substrate), an insulator layer (e.g., a buried oxide (BOX) layer) on the semiconductor substrate, and a device layer (e.g., a semiconductor layer, such as a silicon layer, a III-V semiconductor layer or a II-VI semiconductor layer) on the insulator layer. A second optical waveguide can be formed on the second component. For example, the optical core of a second optical waveguide can be defined in the device layer by shallow trench isolation regions. In this case, the insulator layer, STI regions and interlayer dielectric material that surround the optical core can function as the cladding material for the first optical waveguide. It should be understood that any other suitable optical core/cladding configuration could alternatively be formed. For example, although not shown, the optical core of the second optical waveguide could be defined within a dielectric layer on the second component (e.g., within a nitride layer) and other dielectric materials (e.g., oxide layers) with a smaller refractive index could function as the cladding material. Additionally, a second grating coupler can be formed so that it is coupled to the second optical waveguide at one end. The second grating coupler can incorporate a plurality of essentially parallel fin structures (i.e., essentially parallel elongated narrow bodies). The number of the fin structures in the second grating coupler as well as the configuration of the fin structures in the second grating coupler should be identical to the number of fin structures and configuration of the fin structures in the first grating coupler with each fin structure of the second grating coupler.

Interlayer dielectric material and, particularly, back end of the line (BEOL) interlayer dielectric material can be formed adjacent the second optical waveguide and metal levels (not shown) can be embedded in the BEOL interlayer dielectric material.

Various techniques are well known in the art for forming optical waveguides, forming grating couplers coupled to optical waveguides and forming optical devices (e.g., photodetectors or light sources) coupled to optical waveguides. Thus, the details of such techniques are omitted form the specification in order to allow the reader to focus on the salient aspects of the disclosed methods. It should be noted that the fin structures of the grating couplers could be made of one or more semiconductor materials (e.g., silicon, polysilicon or other suitable semiconductor material), one or more dielectric materials (e.g., silicon nitride, silicon oxynitride, or other suitable dielectric materials) or combinations thereof. Preferably, the materials of the fin structures of the first grating coupler on the first component will be the same as the materials of the fin structures of the second grating coupler on the second component or at least optically equivalent materials. Additionally, the first and second grating couplers can be formed on the first and second components at processes 402 and 404, respectively, such that they are between the optical waveguides and the back end of the line (BEOL) metal levels of those components (as illustrated). Alternatively, the first and second grating couplers can be formed on the first and second components at processes 402-404, respectively, such that they are between the optical waveguides and the insulator layer of those components (not shown).

It should be noted that, if the MCM being formed according the methods of FIG. 4 is an MCM that has multiple integrated circuit chips that are electrically connected to each other and to a package substrate through an interposer, then the first component formed at process 402 can be an integrated circuit chip 110 and the second component formed at process 404 can be an interposer 120, as discussed in detail above with regard to the MCM 100A-100D of FIGS. 1A-1D. Alternatively, if the MCM being formed according to the methods of FIG. 4 is an MCM that has multiple integrated circuit chips stacked vertically and electrically connected to each other, then the first component formed at process 402 can be a first integrated circuit chip 210 and the second component formed at process 404 can be a second integrated circuit chip 220, as discussed in detail above with regard to the methods MCM 200A-200D of FIGS. 2A-2D. In any case, after the first and second components are formed at processes 402-404, the first component can be positioned relative to the second component and attached thereto and, more particularly, physically and electrically connected thereto by interconnects (e.g., solder bumps) such that the first grating coupler is approximately vertically aligned with the second grating coupler (406). It should be noted that, although the grating couplers are referred to as being approximately vertically aligned, optimally, the positioning of the components may be performed such that there is a slight offset in the vertical alignment of the grating couplers and the amount of this slight offset will depend upon the angle the light ray will travel to the chip. Specifically, the light receiving grating coupler will optimally be placed $X*\sin(Y°)$ offset from directly aligned with the light transmitting grating coupler, when X is the vertical distance between the grating couplers and Y is the angle the light will travel to the chip. Thus, for example, in a design where the grating couplers are 10-30 µm in size, where the transmitting grating coupler sends the light at a 20° angle from vertical and where the grating coupler to grating coupler distance is relatively small (e.g., 6 µm), the offset would be 6 µm*sin(20)=2 µm which is much smaller than the 10-30 µm grating size. Techniques for attaching components using interconnects (e.g., solder bumps) are well known in the art and, thus, the details of these techniques are omitted from this specification in order to allow the reader to focus on the salient aspects of the disclosed methods.

Additionally, fill material can be deposited such that in the resulting MCM, fill material is between the first component and the second component (408). This fill material can be, for example, a thermal compound (e.g., thermal paste, gel or grease) for purposes of heat removal. This fill material can be deposited on one component or the other prior to attaching the first component to the second component with the interconnects. Alternatively, the fill material may be injected between the first component and the second component after attaching the first component to the second component with the interconnects.

In any case, the fill material deposited between the first component and the second component at process 408 can be optically transparent fill material (i.e., fill material that is known to be essentially transparent to light signals at desired frequencies) (e.g., see MCM 100A of FIG. 1A, MCM 100B of FIG. 1B, MCM 200A of FIG. 2A and MCM 200B of FIG. 1B). Alternatively, the fill material deposited between the first component and the second component at process 408 can be optically opaque fill material (e.g., see MCM 100C of FIG. 1C, MCM 100D of FIG. 1D, MCM 200C of FIG. 2C and MCM 200D of FIG. 2D). It should be noted that, if the fill material is optically opaque (i.e., not optically transparent), then at least one barrier (e.g., a dielectric spacer) can be formed on either the outermost surface of the interlayer dielectric material of the first component at process 402 or the outermost surface of the interlayer dielectric material of the second component at process 404. Each barrier can be formed such that, once the first component is attached to the second component at process 406 and the fill material is deposited at process 408, the barrier encircles a transmission region between vertically aligned grating couplers (e.g., between the first grating coupler of the first component and the second grating coupler of the second component, etc.) to prevent the fill material from entering the transmission region. Thus, after processes 406-408, the fill material will have an opening between each set of vertically aligned grating couplers (e.g., between the first grating coupler of the first component and the second grating coupler of the second component, etc.), thereby preventing obstruction of light signal transmission between the vertically aligned grating couplers (e.g., see MCM 100C of FIG. 1C, MCM 100D of FIG. 1D, MCM 200C of FIG. 2C and MCM 200D of FIG. 1D).

Additionally, the first component and the second component can be formed at processes 402-404 such that the interlayer dielectric material of the first component is either the same as, or optically equivalent to, the interlayer dielectric material of the second component and further such that it is transparent to light signals at the desired frequencies (e.g., see MCM 100A of FIG. 1A, MCM 100C of FIG. 1C, MCM 200A of FIG. 2A and MCM 200C of FIG. 2C). Alternatively, the first component and the second component can be formed at processes 402-404 such that the interlayer dielectric materials on the two components are different and, particularly, exhibit optically different properties or are optically opaque (e.g., see MCM 100B of FIG. 1B, MCM 100D of FIG. 1D, MCM 200B of FIG. 2B and MCM 200D of FIG. 2D). It should be noted that, if the interlayer dielectric materials on the first component and the second component are different (i.e., exhibit optically different properties) or if they are optically opaque, then the first component and the second component can be formed at processes 402-404 such that the interlayer dielectric materials can have openings that extend vertically to the grating couplers. Such openings can prevent the obstruction of light signal transmission between vertically aligned grating couplers, such as the first grating coupler 213 of the first integrated circuit chip 210 and the second grating coupler 223 of the second integrated circuit chip 220, etc. (e.g., see MCM 200B of FIG. 2B and MCM 200D of FIG. 1D) following attachment of the first component to the second component at process 406.

Forming the MCMs 100A-100B of FIGS. 1A-1D and the MCMs 200A-200D of FIGS. 2A-2D according to the methods of FIG. 4 such that the first grating coupler of the first component and the second grating coupler of the second component are vertically aligned allows for transmission of light signals and, particularly, light signals of various different frequencies between the first optical waveguide on the first component and the second optical waveguide on the second component.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Disclosed above are multi-chip modules (MCMs) that allow for chip-to-chip transmission of light signals. Specifically, the disclosed MCMs can incorporate at least two components, which are attached (e.g., by interconnects). For example, in one MCM disclosed herein, the two components can be an integrated circuit chip and an interposer to which the integrated circuit chip and one or more additional integrated circuit chips are attached by interconnects. In another MCM disclosed herein, the two components can be two integrated circuit chips that are stacked and attached to each other by interconnects. In either case, the two components can each have a waveguide and a grating coupler coupled to one end of the waveguide. The grating couplers on the different components can be approximately vertically aligned, thereby allowing light signals to be transmitted between the waveguides on those different components. Also, disclosed herein are methods of forming such MCMs.

What is claimed is:

1. A multi-chip module comprising:
a first component comprising a first waveguide and a first grating coupler coupled to the first waveguide;
a second component comprising a second waveguide and a second grating coupler coupled to the second waveguide;
interconnects attaching the first component to the second component such that the first grating coupler is approximately vertically aligned with the second grating coupler; and
fill material between the first component and the second component and positioned laterally adjacent to the interconnects, the fill material having at least one of an optically transparent property and an opening that extends from the first component to the second component and that is vertically aligned with the first grating coupler and the second grating coupler,
the first grating coupler and the second grating coupler allowing transmission of light signals between the first waveguide and the second waveguide.

2. The multi-chip module of claim 1, the first component comprising a first integrated circuit chip and the second component comprising any of an interposer and a second integrated circuit chip.

3. The multi-chip module of claim 1, the fill material comprising a thermal compound.

4. The multi-chip module of claim 1, the fill material being optically transparent to light signals at specific frequencies.

5. The multi-chip module of claim 1, the opening comprising a transmission region between the first component and the second component and the multi-chip module further comprising a barrier that encircles the transmission region and prevents the fill material from entering the transmission region.

6. The multi-chip module of claim 1, the interconnects extending between first interlayer dielectric material of the first component and second interlayer dielectric material of the second component, the first interlayer dielectric material and the second interlayer dielectric material having essentially identical optical properties.

7. The multi-chip module of claim 1, the interconnects extending between first interlayer dielectric material of the first component and second interlayer dielectric material of the second component, the first interlayer dielectric material and the second interlayer dielectric material having openings that are vertically aligned with the first grating coupler and the second grating coupler, respectively.

8. A multi-chip module comprising:
an integrated circuit chip comprising a first waveguide and a first grating coupler coupled to the first waveguide;
an interposer comprising a second waveguide and a second grating coupler coupled to the second waveguide;
interconnects attaching the integrated circuit chip to the interposer such that the first grating coupler is approximately vertically aligned with the second grating coupler; and
fill material between the integrated circuit chip and the interposer,
the fill material having an opening extending from the integrated circuit chip to the interposer,
the opening being vertically aligned with the first grating coupler and the second grating coupler, and
the first grating coupler and the second grating coupler allowing transmission of light signals between the first waveguide and the second waveguide.

9. The multi-chip module of claim 8, the fill material comprising a thermal compound.

10. The multi-chip module of claim 8, the fill material being optically transparent.

11. The multi-chip module of claim 8, the opening comprising a transmission region between the integrated circuit chip and the interposer and the multi-chip module further comprising a barrier that encircles the transmission region and prevents the fill material from entering the transmission region.

12. The multi-chip module of claim 8, the interconnects extending between first interlayer dielectric material of the integrated circuit chip and second interlayer dielectric material of the interposer, the first interlayer dielectric material and the second interlayer dielectric material having essentially identical optical properties.

13. The multi-chip module of claim 8, the interconnects extending between first interlayer dielectric material of the integrated circuit chip and a second interlayer dielectric material of the interposer, the first interlayer dielectric material and the second interlayer dielectric material having openings that are vertically aligned with the first grating coupler and the second grating coupler, respectively.

14. The multi-chip module of claim 8, further comprising:
at least one additional integrated circuit chip;
additional interconnects attaching the additional integrated circuit chip to the interposer; and
additional waveguides and additional grating couplers allowing light signal transmission between the integrated circuit chip and the at least one additional integrated circuit chip through the interposer.

15. The multi-chip module of claim 8, the second waveguide receiving a light signal from an off-chip optical fiber and the light signal being propagated along the second waveguide, through the second grating coupler, through the first grating coupler and through the first waveguide.

16. A method of forming a multi-chip module, the method comprising:
forming a first component comprising a first waveguide and a first grating coupler coupled to the first waveguide;
forming a second component comprising a second waveguide and a second grating coupler coupled to the second waveguide; and
positioning the first component relative to the second component and attaching the first component to the second component with interconnects such that the first grating coupler is approximately vertically aligned with the second grating coupler and such that fill material is between the first component and the second component and positioned laterally adjacent to the interconnects, the fill material having at least one of an optically transparent property and an opening that extends from the first component to the second component and that is vertically aligned with the first grating coupler and the second grating coupler, the first grating coupler and the second grating coupler allowing transmission of light signals between the first waveguide and the second waveguide.

17. The method of claim 16, the first component comprising a first integrated circuit chip and the second component comprising any of an interposer and a second integrated circuit chip.

18. The method of claim 16, the fill material comprising a thermal compound.

19. The method of claim 16, the fill material being optically transparent to light signals at specific frequencies.

20. The method of claim 16, further comprising forming a barrier that encircles the opening in order to prevent the fill material from entering a transmission region.

* * * * *